United States Patent
Kakutani

(10) Patent No.: US 11,188,019 B2
(45) Date of Patent: Nov. 30, 2021

(54) POWER CONTROL APPARATUS AND IMAGE FORMING APPARATUS

(71) Applicant: CANON KABUSHIKI KAISHA, Tokyo (JP)

(72) Inventor: Toshifumi Kakutani, Moriya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 92 days.

(21) Appl. No.: 16/819,638

(22) Filed: Mar. 16, 2020

(65) Prior Publication Data
US 2020/0310326 A1   Oct. 1, 2020

(30) Foreign Application Priority Data
Mar. 26, 2019 (JP) .............................. JP2019-059022

(51) Int. Cl.
*G03G 15/00* (2006.01)
*H02M 1/00* (2006.01)

(52) U.S. Cl.
CPC .............. *G03G 15/80* (2013.01); *H02M 1/00* (2013.01); *H02M 1/0009* (2021.05); *H02M 1/0012* (2021.05)

(58) Field of Classification Search
CPC ........... G03G 15/2039; G03G 15/5004; G03G 15/80; H02M 1/00; H02M 1/0009; H02M 1/0012
See application file for complete search history.

(56) References Cited

U.S. PATENT DOCUMENTS

| | | | |
|---|---|---|---|
| 2007/0212103 A1* | 9/2007 | Kikuchi | ............. G03G 15/0283 399/88 |
| 2013/0154602 A1* | 6/2013 | Courtel | ................... H02M 1/42 323/311 |
| 2016/0181798 A1* | 6/2016 | Izadian | ................. H02M 7/797 307/31 |
| 2017/0063252 A1* | 3/2017 | Fukumaru | ........... H02M 7/5387 |
| 2017/0187292 A1* | 6/2017 | Schaemann | ............ G01R 23/02 |
| 2020/0337126 A1* | 10/2020 | Chen | ...................... H05B 41/24 |
| 2020/0366079 A1* | 11/2020 | Telefus | ................ H01H 33/593 |

FOREIGN PATENT DOCUMENTS

JP            2011197242 A          10/2011

* cited by examiner

*Primary Examiner* — Francis C Gray
(74) *Attorney, Agent, or Firm* — Rossi, Kimms & McDowell LLP

(57) ABSTRACT

A power control apparatus includes a voltage detection circuit configured to generate a voltage signal as an analog signal corresponding to a voltage value of AC power supplied from a commercial power supply to a predetermined load, and a current detection circuit configured to generate a current signal as an analog signal corresponding to a current value of the AC power. The power control apparatus further includes an A/D converter configured to convert each of the voltage signal and the current signal into a digital signal, a switch, a signal processor configured to control a switching operation of the switch based on a detection timing for the voltage value and a detection timing for the current value, and a controller configured to control supply of the AC power to the load.

12 Claims, 8 Drawing Sheets

POWER CONTROL APPARATUS AND IMAGE FORMING APPARATUS

BACKGROUND OF THE INVENTION

Field of the Invention

The present disclosure relates to an image forming apparatus such as a copying machine or printer that adopts an electrophotographic process, and more particularly, to a power control apparatus provided in an image forming apparatus.

Description of the Related Art

Some power control apparatuses are configured to control power supply from a commercial power supply to a load based on a voltage value of an AC voltage or a current value of an AC current applied to the load from the commercial power supply. The power control apparatus can detect the voltage value of the AC voltage or the current value of the AC current through use of a voltage detection transformer or a current detection transformer. In this case, the AC voltage and the AC current are converted into a suitable voltage by the voltage detection transformer and the current detection transformer, respectively, rectified, and then converted into a corresponding digital signal by different analog/digital (A/D) converters. The voltage value or the current value is detected from the digital signal. In the configuration in which an AC voltage from the commercial power supply is applied to the load, power supply to the load is controlled based on a timing of zero-cross at which a polarity of the AC voltage is reversed. The zero-cross is detected by another circuit.

In Japanese Patent Application Laid-open No. 2011-197242, there is disclosed a technology of detecting both of an AC voltage and a current flowing through a fixing heater, to thereby control switching of resistance values of the fixing heater based on the detection results.

The related-art configuration requires two A/D converters for voltage detection and current detection. Such a configuration leads to enlargement of a substrate on which the A/D converters are to be mounted. This is an obstacle to size reduction of an entire apparatus. Further, the number of components is increased, and hence a cost is increased. In particular, in the configuration in which the zero-cross is detected by another circuit, such a tendency is prominent. In view of this, a primary object of the present disclosure is to provide a power control apparatus capable of controlling power to a load with a smaller configuration than a related-art configuration.

SUMMARY OF THE INVENTION

A power control apparatus of the present disclosure includes: a voltage detection circuit configured to generate a voltage signal as an analog signal corresponding to a voltage value of AC power supplied from a commercial power supply to a predetermined load; a current detection circuit configured to generate a current signal as an analog signal corresponding to a current value of the AC power; an A/D converter configured to convert each of the voltage signal and the current signal into a digital signal; a switch configured to selectively output any one of the voltage signal and the current signal to the A/D converter; a signal processor configured to control a switching operation of the switch based on a detection timing for the voltage value and a detection timing for the current value, which are determined based on the voltage signal; and a controller configured to control supply of the AC power to the load based on the digital signal obtained from the A/D converter.

Further features of the present invention will become apparent from the following description of exemplary embodiments (with reference to the attached drawings).

DESCRIPTION OF THE EMBODIMENTS

An image reading apparatus using a power control apparatus according to an embodiment of the present disclosure is described with reference to the drawings.

Image Forming Apparatus

Figure 1:
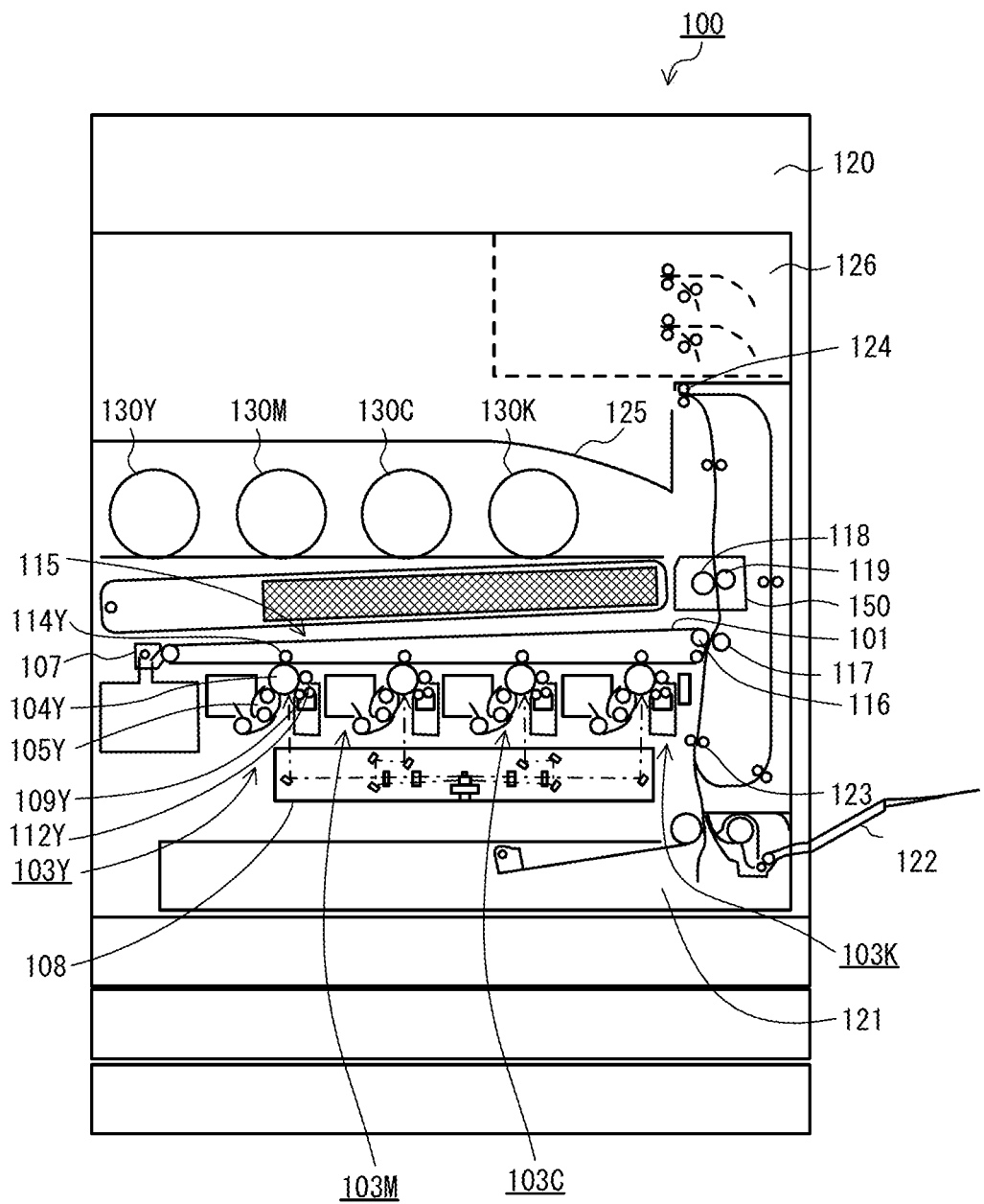
FIG. 1 is an explanatory view for illustrating a configuration of an image forming apparatus according to the present disclosure.

FIG. 1 is an explanatory view for illustrating a configuration of an image forming apparatus including the power control apparatus of this embodiment. An image forming apparatus 100 is an electrophotographic full-color image forming apparatus configured to form an image on a recording material. The image forming apparatus 100 includes toner containers 130Y, 130M, 130C, and 130K, each of which contains replenishing developer (hereinafter referred to as "toner"). The toner containers 130Y, 130M, 130C, and 130K are removably mounted to a main body of the image forming apparatus 100. The image forming apparatus 100 includes an image reading apparatus 120 configured to read an image of an original, and a user interface (UI) 126 configured to receive an instruction made by a user, and provide the user with information.

The image forming apparatus 100 includes four image forming units 103Y, 103M, 103C, and 103K arranged at regular intervals. The image forming units 103Y, 103M, 103C, and 103K are removably mounted to the main body of the image forming apparatus 100. The image forming units 103Y, 103M, 103C, and 103K are configured to form images of different colors. The image forming apparatus 100 includes a laser exposure device 108 for use during image formation by the image forming units 103Y, 103M, 103C, and 103K. The image forming apparatus 100 includes an intermediate transfer belt unit 115 including an intermediate transfer belt 101 on which an image is transferred from each of the image forming units 103Y, 103M, 103C, and 103K. The image forming apparatus 100 includes a transfer unit configured to transfer the images on the intermediate transfer belt 101 to the recording material, and a fixing device 150 configured to fix the images onto the recording material.

The image forming units 103Y, 103M, 103C, and 103K differ only in color of an image to be formed, and have the same configuration and execute the same processing. The image forming unit 103Y forms an image in yellow (Y). The image forming unit 103M forms an image in magenta (M). The image forming unit 103C forms an image in cyan (C). The image forming unit 103K forms an image in black (K). In this example, only the configuration and processing of the image forming unit 103Y are described, and a description of the configuration and processing of the image forming units 103M, 103C, and 103K is omitted.

The image forming unit 103Y includes a drum-type photosensitive member (hereinafter referred to as "photosensitive drum") 104Y as an image bearing member. In the periphery of the photosensitive drum 104Y, a charging device 109Y, a developing device 105Y, and a drum cleaner 112Y are provided. At an opposite position to the photosensitive drum 104Y across the intermediate transfer belt 101, a primary transfer roller 114Y is provided.

The photosensitive drum 104Y has, on its aluminum-made drum base, a photoconductive layer formed from a negatively-charged organic photoconductor (OPC). The photosensitive drum 104Y is rotated at a predetermined process speed by a drive motor (not shown). The charging device 109Y is configured to uniformly charge the surface of the photosensitive drum 104Y to a predetermined negative potential through use of a charging bias applied by a charging bias power supply (not shown).

The laser exposure device 108 includes a light emitting unit configured to emit laser light controlled in accordance with time-series electric digital pixel signals (hereinafter referred to as "image data") indicating an image to be formed. The laser exposure device 108 is configured to expose the charged surface of the photosensitive drum 104 to laser light, to thereby form an electrostatic latent image corresponding to the image data on the surface of the photosensitive drum 104. In this example, a yellow electrostatic latent image is formed based on yellow image data. The developing device 105Y contains toner (developer), and is configured to cause the toner (in this example, yellow toner) to adhere to the electrostatic latent image formed on the photosensitive drum 104Y, to thereby develop the image as a toner image (form a visible image). The primary transfer roller 114Y is biased toward the photosensitive drum 104Y side across the intermediate transfer belt 101. The primary transfer roller 114Y is configured to transfer the yellow toner image formed on the photosensitive drum 104Y onto the intermediate transfer belt 101. The drum cleaner 112Y is configured to remove, after the transfer, transfer residual toner remaining on the photosensitive drum 104Y therefrom. For that purpose, the drum cleaner 112Y includes a cleaning blade, for example.

The image forming units 103M, 103C, and 103K are similarly configured to form a toner image and transfer the toner image onto the intermediate transfer belt 101. The image forming units 103Y, 103M, 103C, and 103K transfer toner images of different colors in a superimposed way on the intermediate transfer belt 101 at a corresponding timing in accordance with the rotation of the intermediate transfer belt 101. With this operation, full-color toner images are formed on the intermediate transfer belt 101.

The intermediate transfer belt unit 115 includes a drive roller 116 also serving as a secondary transfer opposing roller, and a gear on a drive roller shaft (not shown). The intermediate transfer belt 101 is rotated by the drive roller 116, the gear on the drive roller shaft, and a drive gear (also not shown) on the main body. The drive roller 116 is provided opposite to a secondary transfer roller 117 forming the transfer unit, across the intermediate transfer belt 101. The transfer unit is configured to convey the recording material with the recording material and the intermediate transfer belt 101 being nipped between the drive roller 116 and the secondary transfer roller 117, to thereby transfer the toner images on the intermediate transfer belt 101 onto the recording material.

The fixing device 150 is provided downstream of the secondary transfer roller 117 in a conveyance direction of the recording material. The fixing device 150 includes a fixing roller 118 and a pressure roller 119. The fixing roller 118 is heated by a fixing heater described below. The fixing device 150 is configured to apply heat and pressure to the recording material having transferred thereonto the toner images, through use of the fixing roller 118 and the pressure roller 119, so as to fix the images onto the recording material.

The recording material is a sheet-like recording medium to be fed from a sheet feeding cassette 121 or a manual feed tray 122. On a conveyance path for feeding the recording material, registration rollers 123 and delivery rollers 124 are provided. The registration rollers 123 serve to convey the recording material to the transfer unit. The delivery rollers 124 serve to discharge to a discharge tray 125 the recording material having the images formed thereon. The registration rollers 123 are configured to correct, for example, skew of the recording material, and convey the recording material to the transfer unit in accordance with a timing at which the toner image formed on the intermediate transfer belt 101 is conveyed to the transfer unit.

The image forming apparatus 100 in the above-mentioned configuration performs image forming processing as follows in response to an instruction to form an image, which is made by a user with the UI 126. In this example, a description is given of copying processing for forming on the recording material an image of the original read by the image reading apparatus 120. With regard to the image forming units 103Y, 103M, 103C, and 103K, Y, M, C, and K suffixed to respective reference symbols are omitted because color identification is not required in the following description. With regard to each photosensitive drum 104 or other components as well, Y suffixed to reference symbols is omitted in the following description.

In a case where receiving the instruction to form an image, the image forming apparatus 100 causes the image reading apparatus 120 to read an image of the original. The image reading apparatus 120 generates image data indicating the read image and then transmits the data to the image forming apparatus 100. The image data is generated for each color, that is, yellow, magenta, cyan, and black. The image forming apparatus 100 can obtain image data from an external device such as a personal computer or a portable memory as well as the image reading apparatus 120.

The photosensitive drum 104 of the image forming unit 103 is rotated at a predetermined process speed, and its surface is negatively charged uniformly by the charging device 109. The laser exposure device 108 irradiates the photosensitive drum 104 with laser light modulated in accordance with the image data, to thereby form an electrostatic latent image on the photosensitive drum 104. The developing device 105 causes toner to adhere onto the electrostatic latent image formed on the photosensitive drum 104 through application of a developing bias having the same polarity as the polarity (negative polarity) of the charged photosensitive drum 104, to thereby form a toner image as a visible image. The toner image on the photosensitive drum 104 is transferred onto the rotationally driven intermediate transfer belt 101 by the primary transfer roller 114 applied with a primary transfer bias (opposite polarity (positive polarity) to that of the toner). On the intermediate transfer belt 101, the toner images of different colors, that is, yellow, magenta, cyan, and black are successively transferred in a superimposed way. The transfer residual toner remaining on the photosensitive drum 104 is scraped off by, for example, a cleaner blade provided in each drum cleaner 112, and collected.

The full-color toner images on the intermediate transfer belt 101 are conveyed to the transfer unit. In synchronization with a timing at which a tip end of each of the conveyed toner images reaches the transfer unit, the recording material fed from the sheet feeding cassette 121 or the manual feed tray 122 is conveyed by the registration rollers 123 to the transfer unit. On the recording material conveyed to the transfer unit, the full-color toner images on the intermediate transfer belt 101 are collectively transferred by the secondary transfer roller 117 applied with a secondary transfer bias (opposite polarity (positive polarity) to that of the toner). After the transfer, residual toner remaining on the intermediate transfer belt 101 is scraped off by a transfer cleaner 107, and collected as waste toner.

The recording material having formed thereon the full-color toner images is conveyed to the fixing device 150, and at a fixing nip portion between the fixing roller 118 and the pressure roller 119, heat and pressure are applied to the full-color toner images. As a result, the images are thermally fixed onto the surface of the recording material. The recording material is discharged by the delivery rollers 124 onto the discharge tray 125 provided at an upper surface of the main body. Through the above-mentioned operations, a series of image forming processing is completed.

Power Control Apparatus

Figure 2:
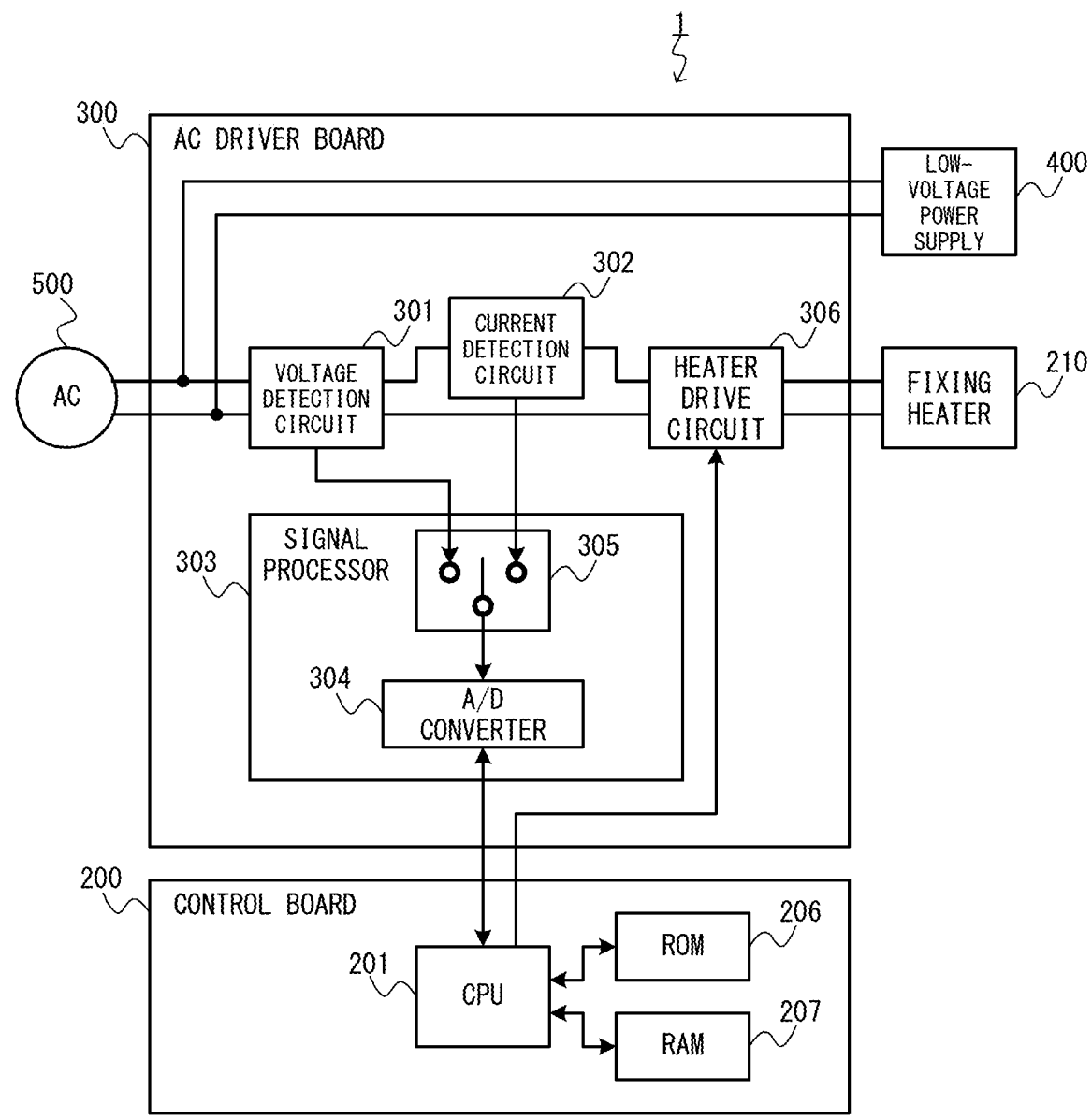
FIG. 2 is a configuration diagram of a power control apparatus according to the present disclosure.
Figure 3:
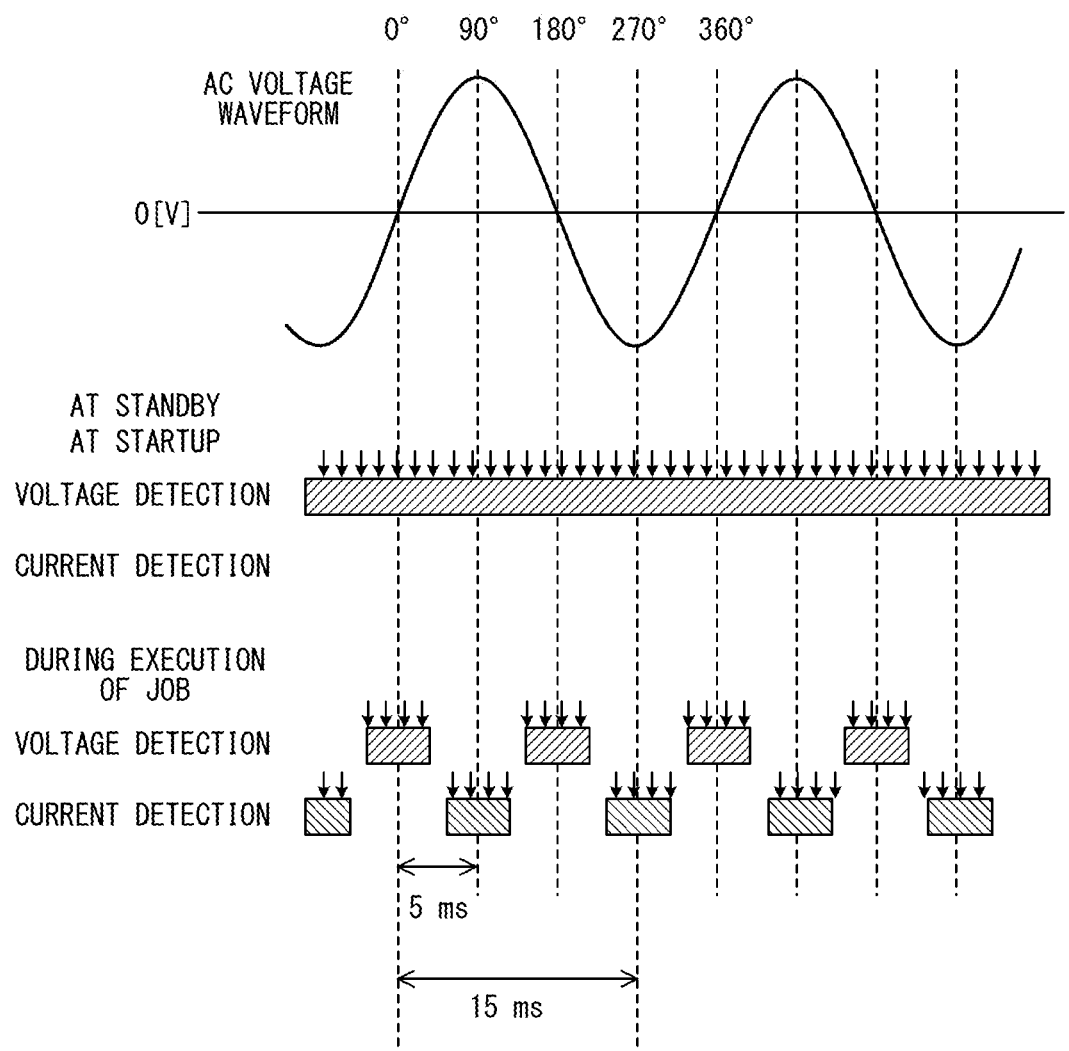
FIG. 3 is an explanatory graph of detection timings for an AC voltage and an AC current.

FIG. 2 is a configuration diagram of the power control apparatus in the image forming apparatus 100. The following description is given taking a fixing heater 210 for heating the fixing roller 118 as an example of a load to be supplied with power. A power control apparatus 1 is configured to control power supply to the fixing heater 210. FIG. 3 is an explanatory graph of timings at which the power control apparatus 1 of FIG. 2 detects an AC voltage and an AC current.

The power control apparatus 1 includes an AC driver board 300 and a control board 200. The AC driver board 300 includes a voltage detection circuit 301, a current detection circuit 302, a signal processor 303, and a heater drive circuit 306. The signal processor 303 includes an A/D converter 304 and a switch 305. The control board 200 includes a central processing unit (CPU) 201, a read only memory (ROM) 206, and a random access memory (RAM) 207. An input side of the AC driver board 300 is connected to a commercial power supply 500. An output side of the AC driver board 300 is connected to a low-voltage power supply 400 and the fixing heater 210. An output of the low-voltage power supply 400 is used as power for the control board 200 or other components.

A supply path for AC power supplied from the commercial power supply 500 to the AC driver board 300 is branched to a path to the low-voltage power supply 400 and a path to the fixing heater 210. As shown in FIG. 3, a voltage supplied from the commercial power supply 500 has an AC voltage waveform with a voltage of 0 V being used as a reference. For example, in a region in which an effective value of a commercial power supply is 100 V, the AC voltage waveform has a peak value of 141 V. The low-voltage power supply 400 is configured to convert the supplied AC power into a voltage of low voltage value for use in driving components in the image forming apparatus 100, and then supply the voltage to the components. The low-voltage power supply 400 is configured to generate voltages of different voltage values suitable for the components, for example. In the path to the fixing heater 210, the AC power is supplied to the fixing heater 210 via the voltage detection circuit 301, the current detection circuit 302, and the heater drive circuit 306.

The voltage detection circuit 301 is configured to output to the switch 305 a voltage signal as an analog signal obtained by converting a voltage value of the AC power (AC voltage) into a predetermined voltage value. For example, in a case where the A/D converter 304 has an input range of 3.3 V, the voltage detection circuit 301 performs voltage conversion at a rate at which the peak value of the AC voltage from the commercial power supply 500, that is, 141 V becomes equal to or less than 3.3 V, so as to generate a voltage signal.

The current detection circuit 302 is configured to output to the switch 305 a current signal as an analog signal indicating a current value of the AC power (AC current) supplied from the heater drive circuit 306 to the fixing heater 210. For example, in a case where a peak current flowing through the fixing heater 210 is 10 A, and the A/D converter 304 has an input range of 3.3 V, the current detection circuit 302 performs conversion so as to obtain a voltage value equal to or less than 3.3 V with respect to the current of 10 A, to thereby generate a current signal.

The heater drive circuit 306 includes, for example, a triac. The heater drive circuit 306 is configured to drive the triac at a predetermined timing or in a predetermined mode to control AC power supply to the fixing heater 210.

The switch 305 is configured to output to the A/D converter 304 any one of the voltage signal output from the voltage detection circuit 301 and the current signal output from the current detection circuit 302. The signals to be output are switched by the signal processor 303 at a predetermined timing. The A/D converter 304 is configured to convert the voltage signal or the current signal into a digital signal. The converted digital signal is output to the CPU 201 of the control board 200. The digital signal indicates a voltage value or current value of the AC power supplied from the commercial power supply 500. The signal processor 303 is an integrated circuit (IC) for determining detection timings for the AC voltage and the AC current. The detection timings for the AC voltage and the AC current are described in detail below.

The CPU 201 of the control board 200 is configured to control image forming processing to be performed by the image forming apparatus 100. In this embodiment, a description is given of how the CPU 201 controls power supply to the fixing heater 210. The CPU 201 obtains a digital signal from the A/D converter 304 of the AC driver board 300. The CPU 201 determines a timing of power supply to the fixing heater 210 based on the digital signal. The CPU 201 transmits a control signal to the heater drive circuit 306 at the determined timing to control driving of the triac in the heater drive circuit 306, to thereby control the power supply to the fixing heater 210. In the configuration illustrated in FIG. 2, a control signal is directly transmitted from the CPU 201 to the heater drive circuit 306, but may be transmitted from the CPU 201 via the signal processor 303 to the heater drive circuit 306.

With reference to FIG. 3, a description is given of how the signal processor 303 determines detection timings for an AC voltage and an AC current. Current detection by the current detection circuit 302 is intended for the AC power supplied to the load during execution of a job. Thus, the current detection is not performed, for example, when the image forming apparatus 100 is at standby (in a state of being ready for image formation and standby for start of the image formation) or at startup (in a state of executing a preparation operation after power-on). In FIG. 3, hatched regions represent detection periods for sampling, and down arrows indicate a part of a plurality of sampling points set in those periods. Further, during execution of the job, voltage detection periods and current detection periods do not overlap each other.

All through the standby or startup time of the image forming apparatus 100, the switch 305 is set to select a voltage signal from the voltage detection circuit 301. The signal processor 303 detects, based on the voltage signal, a frequency, zero-cross timing, voltage value, or other such information of the AC power (AC voltage). The signal processor 303 calculates an effective value of the AC voltage from the detected voltage value. With this, an effective value of an actual voltage at an installation site of the image forming apparatus 100 can be obtained. The signal processor 303 transmits the effective value of the AC voltage to the CPU 201.

The CPU 201 selects a control method for the fixing heater 210 in accordance with the effective value of the AC voltage. The control method for the fixing heater 210 includes, for example, phase control, wave-number control, and a combination of the phase control and the wave-number control. The CPU 201 switches those control methods based on the effective value of the AC voltage supplied from the commercial power supply 500. With this, the control methods are switched in accordance with regional differences in effective value of the AC voltage, for example, a difference between a region in which the effective value is 100 V and a region in which the effective value is 230 V.

The detection timings for an AC voltage and an AC current during execution of the job are described. A timing of power supply to the fixing heater 210 is determined with reference to the zero-cross of an AC voltage waveform of the AC voltage. In a case of the phase control for the fixing heater 210, the CPU 201 controls the heater drive circuit 306 to supply the AC power to the fixing heater 210 after two milliseconds from leading edge of zero-cross, for example. That is, voltage values at around the zero-cross are required to determine a timing of power supply to the fixing heater 210. Thus, the detection timing for the voltage value is close to a zero-cross timing.

A current value is detected at each peak timing of the AC current. When AC power is supplied to a resistance load, there is no delay between an AC voltage and an AC current, and hence the AC current has a peak at around a peak of an AC voltage waveform. With the fixing heater 210 being a resistance load, a peak of the AC voltage supplied from the commercial power supply 500 matches a peak of the AC current. Thus, the detection timing for the current value is set to points of time around the peak of the AC voltage waveform, which correspond to phases of 90° and 270°.

Specifically, in a case where the AC voltage (AC voltage waveform) has a frequency of 50 Hz, one cycle is 20 milliseconds. To describe the phase with reference to the leading edge of zero-cross, the phase is 90° and 270° after 5 milliseconds and 15 milliseconds from a rising timing of the AC voltage waveform, respectively. In a case where a detection period at each phase is set in a range of a predetermined period therearound (in this example, 2 milliseconds), the detection timing for the voltage value is set to 8 milliseconds to 12 milliseconds and 18 milliseconds to 22 milliseconds with the leading edge of zero-cross being 0 second. The detection timing for the current value is set to 3 milliseconds to 7 milliseconds and 13 milliseconds to 17 milliseconds with the leading edge of zero-cross being 0 second. In the example shown in FIG. 3, the detection of a voltage value is stopped at the time when the leading edge of zero-cross is detected. Thus, a detection time for the voltage value at such a leading edge is somewhat shorter than the set value.

The detection timing may be set with reference to the trailing edge of zero-cross as well as the leading edge of zero-cross. In this case, the detection timing for the current value is set to 3 milliseconds to 7 milliseconds from the trailing edge of zero-cross, and the detection timing for the voltage value is set to 8 milliseconds to 12 milliseconds from the trailing edge of zero-cross. When a trailing edge is detected upon detection of the voltage value, the detection timing for the current value is in a range from 3 milliseconds to 7 milliseconds from the detection, and the detection timing for the voltage value is in a range from 8 milliseconds to 12 milliseconds. In this case as well, the voltage value and the current value can be detected at desired timings. The signal processor 303 can set the detection timing for the voltage value and the detection timing for the current value based on the voltage signal (AC voltage waveform) as described above.

The signal processor 303 controls a switching operation of the switch 305 based on the thus-determined detection timings for the voltage value and the current value. With this, the CPU 201 obtains a digital signal converted from the voltage signal at the detection timing of the voltage value, and obtains a digital signal converted from the current signal at the detection timing of the current value.

The CPU 201 monitors a current value of the AC current flowing through the fixing heater 210 during execution of the job at the thus-set detection timings. The CPU 201 can control, based on the monitoring result, the heater drive circuit 306 so as not to supply to the fixing heater 210 a current of more than a predetermined current value (for example, 15 A) or a power of more than a predetermined power value (for example, 1,500 W). Therefore, it is not required to set any margin below a limit value, and maximum possible power can be supplied. In this way, high productivity can be ensured. In this case, a current value on the low-voltage power supply 400 side is not monitored in real time, but is estimated based on data obtained beforehand in the stage of consideration. The CPU 201 performs control in accordance with a total value of estimated current consumption in the low-voltage power supply 400 and a detected current value in the fixing heater 210.

Figure 4:
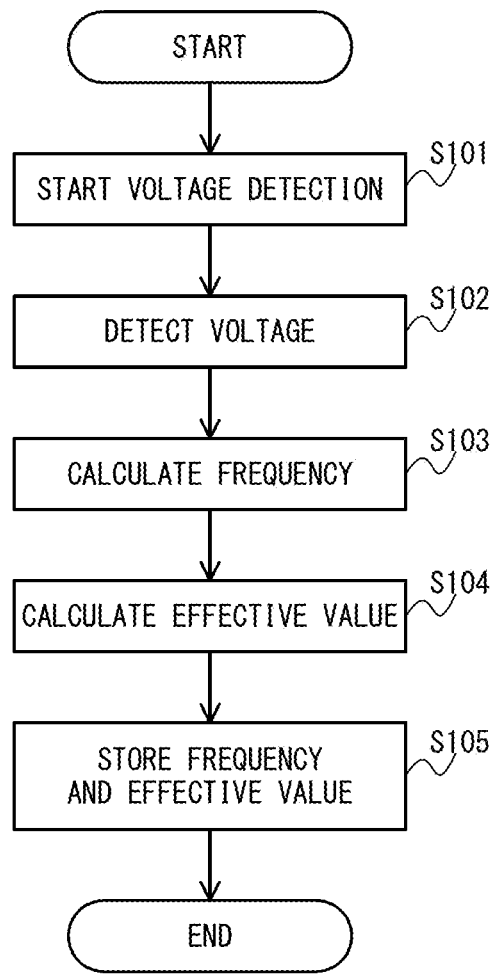
FIG. 4 is a flowchart for illustrating processing of the power control apparatus at startup.

FIG. 4 is a flowchart for illustrating processing of the power control apparatus 1 at startup of the image forming apparatus 100. As described with reference to FIG. 3, the voltage detection is performed at startup.

When the image forming apparatus 100 starts up, the AC power is supplied to the AC driver board 300 from the commercial power supply 500. The voltage detection circuit 301 transmits to the switch 305 a voltage signal converted from the supplied AC power (AC voltage). The switch 305 is set to continuously select a voltage signal from the voltage detection circuit 301 by the signal processor 303. The signal processor 303 starts detecting a voltage value based on the voltage signal obtained through use of the switch 305 (Step S101).

The signal processor 303 detects a voltage value based on the voltage signal at each of the sampling points set at regular intervals in the hatched detection periods at startup as shown in FIG. 3 (Step S102). The signal processor 303 calculates a frequency of the AC voltage based on a change among the detected voltage values (Step S103). The signal processor 303 calculates an effective value of the AC voltage based on the change among the detected voltage values (Step S104). The signal processor 303 stores the calculated frequency and effective value in a predetermined memory (Step S105). For example, the signal processor 303 transmits the calculated frequency and effective value to the CPU 201. The CPU 201 stores the obtained frequency and effective value in the RAM 207. Through the above-mentioned steps, the processing of the power control apparatus 1 at startup is completed.

Figure 5:
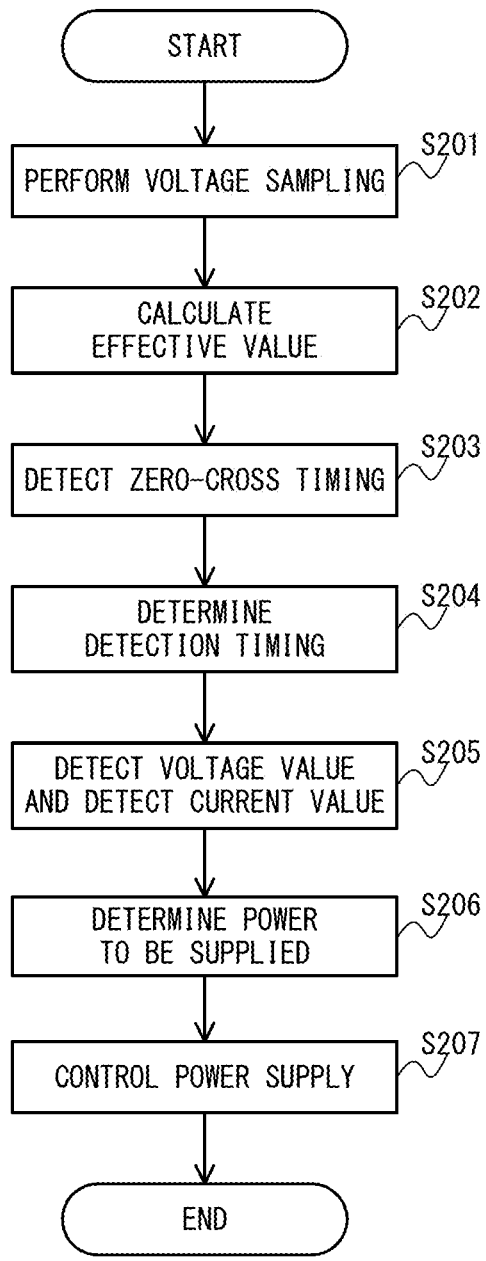
FIG. 5 is a flowchart for illustrating processing of the power control apparatus during execution of a job.

FIG. 5 is a flowchart for illustrating processing of the power control apparatus 1 during execution of a print job by the image forming apparatus 100. The job is started in response to a user's instruction made with the UI 126. The processing includes processing of controlling power supply to the fixing heater 210.

When the instruction to start the job is made, the voltage detection circuit 301 outputs a voltage signal converted from supplied AC power (AC voltage) to the switch 305. The current detection circuit 302 outputs a current signal converted from the supplied AC power (AC current) to the switch 305. The switch 305 is, as its initial state at the beginning of the job, set to select a voltage signal from the voltage detection circuit 301 by the signal processor 303. The signal processor 303 detects a voltage value based on the voltage signal obtained through use of the switch 305 (Step S201). The signal processor 303 detects a voltage value based on the voltage signal at every predetermined sampling point.

The signal processor 303 calculates an effective value of the AC voltage based on a change among the detected voltage values (Step S202). The signal processor 303 outputs the calculated effective value to the CPU 201. The signal processor 303 detects a zero-cross timing of the AC voltage based on the change among the detected voltage values (Step S203). The signal processor 303 determines a detection timing for the voltage value of the AC voltage and a detection timing for the current value of the AC current based on the detected zero-cross timing (Step S204). In this example, as shown in FIG. 3, the zero-cross timing at which the polarity of the AC voltage is switched from negative to positive is set to 0° in phase, and under this setting, the detection timing for the voltage value of the AC voltage is set to 0° and 180°, and the detection timing for the current value of the AC current is set to 90° and 270°.

The signal processor 303 controls the switching operation of the switch 305 at the determined detection timing. With this, the CPU 201 obtains a digital signal converted from the voltage signal at the detection timing of the voltage value, and obtains a digital signal converted from the current signal at the detection timing of the current value. The CPU 201 detects a voltage value based on the digital signal obtained at the detection timing of the voltage value, and detects a current value based on the digital signal obtained at the detection timing of the current value (Step S205).

The CPU 201 determines power to be supplied to the fixing heater 210 based on the detected current value (Step S206). The CPU 201 compares the detected current value and a current value as an upper limit of a suppliable current amount, and determines power to be supplied based on the comparison result. For example, when a current of 15 A can be supplied to the fixing heater 210, the CPU 201 compares the detected current value with the current of 15 A. In a case where the detected current value is smaller than the current of 15 A as a result of the comparison, the CPU 201 determines that higher power (for example, 950 W) is to be supplied to the fixing heater 210. In a case where the detected current value is very close to the current of 15 A as a result of the comparison, the CPU 201 determines that lower power (for example, 900 W) is to be supplied to the fixing heater 210. Here, in a case where the effective value calculated in the processing in Step S202 is different from the effective value calculated in the processing of FIG. 4, the CPU 201 calculates power based on the effective value calculated in the processing in Step S202. With this, even when the voltage value is varied at the installation site of the image forming apparatus 100, the CPU 201 can calculate power based on a more accurate voltage effective value.

The CPU 201 controls power supply to the fixing heater 210 based on the determined power (Step S207). The CPU 201 terminates the control of power supply to the fixing heater 210 at the completion of the job. The CPU 201 generates a control signal for the heater drive circuit 306 in accordance with the power to be supplied. For example, the CPU 201 determines a duty ratio of the control signal. In this case, the heater drive circuit 306 supplies AC power to the fixing heater 210 in accordance with the duty ratio. To describe the duty ratio of the control signal during phase control, the ON time accounts for 80% of a half-wave period in a case of supplying power of 900 W, and accounts for 85% of the half-wave period in a case of supplying power of 950 W. To describe the duty ratio of the control signal during wave-number control, the ON time accounts for 18 half waves out of 20 half waves in a case of supplying power of 900 W, and accounts for 19 half waves out of 20 half waves in a case of supplying power of 950 W.

As described above, in the image forming apparatus 100 of this embodiment, the switch 305 is provided between the voltage detection circuit 301 and the A/D converter 304 and between the current detection circuit 302 and the A/D converter 304, and the switch 305 switches a voltage signal and a current signal to be input to the A/D converter 304 at a predetermined timing. With this, the single A/D converter 304 is sufficient for the voltage detection and the current detection. Therefore, the requisite number of components can be reduced, and thus the size of a mounting substrate and cost can be reduced.

Further, the power control apparatus 1 detects a zero-cross timing through sampling of voltage values, and determines a detection timing for a voltage value or a current value based on the detected zero-cross timing. Therefore, no special configuration is required to detect the zero-cross, and thus the size of the mounting substrate and cost can be reduced.

Modification Example 1

Figure 6:
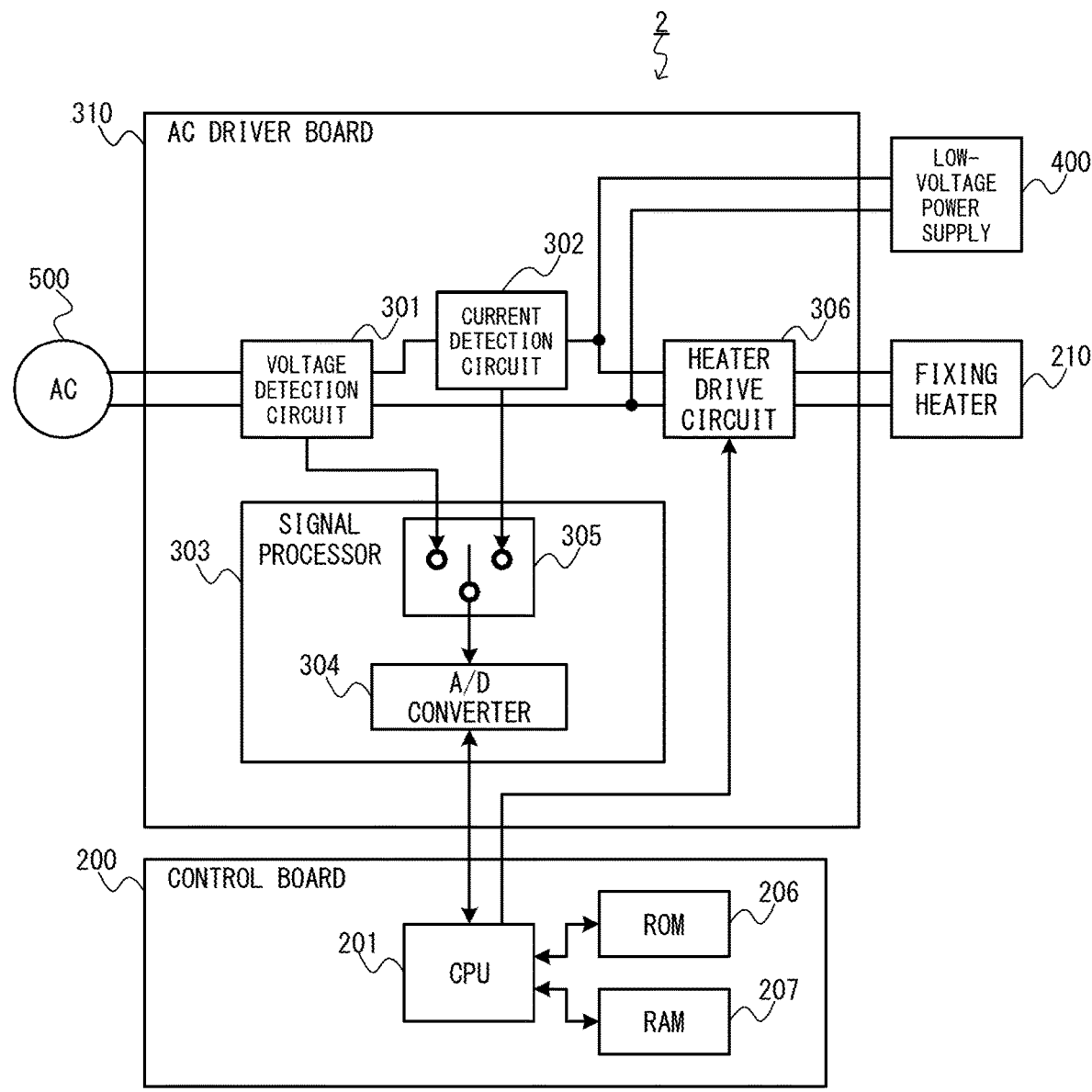
FIG. 6 is a diagram for illustrating a modification example of an AC driver board.

FIG. 6 is a diagram for illustrating a modification example of the AC driver board. Unlike the AC driver board 300 of FIG. 2, in an AC driver board 310, the path to the low-voltage power supply 400 diverges from the path to the fixing heater 210 between the current detection circuit 302 and the fixing heater 210. A voltage signal output from the voltage detection circuit 301 is the same as the voltage signal output from the voltage detection circuit 301 of the AC driver board 300 of FIG. 2. Further, detection timings for a voltage value and a current value are also the same as those of FIG. 2.

In the AC driver board 310, the current detection circuit 302 can detect both of a current value of a current supplied to the low-voltage power supply 400 and that supplied to the fixing heater 210. That is, a total value of the currents supplied to both of the low-voltage power supply 400 and the fixing heater 210 from the AC driver board 310 can be detected. Therefore, a power control apparatus 2 including the AC driver board 310 can detect a current value with higher accuracy and can control the current value (power) with higher accuracy than the configuration of FIG. 2 in which power consumption in the low-voltage power supply 400 is estimated for the control.

Modification Example 2

Figure 7:
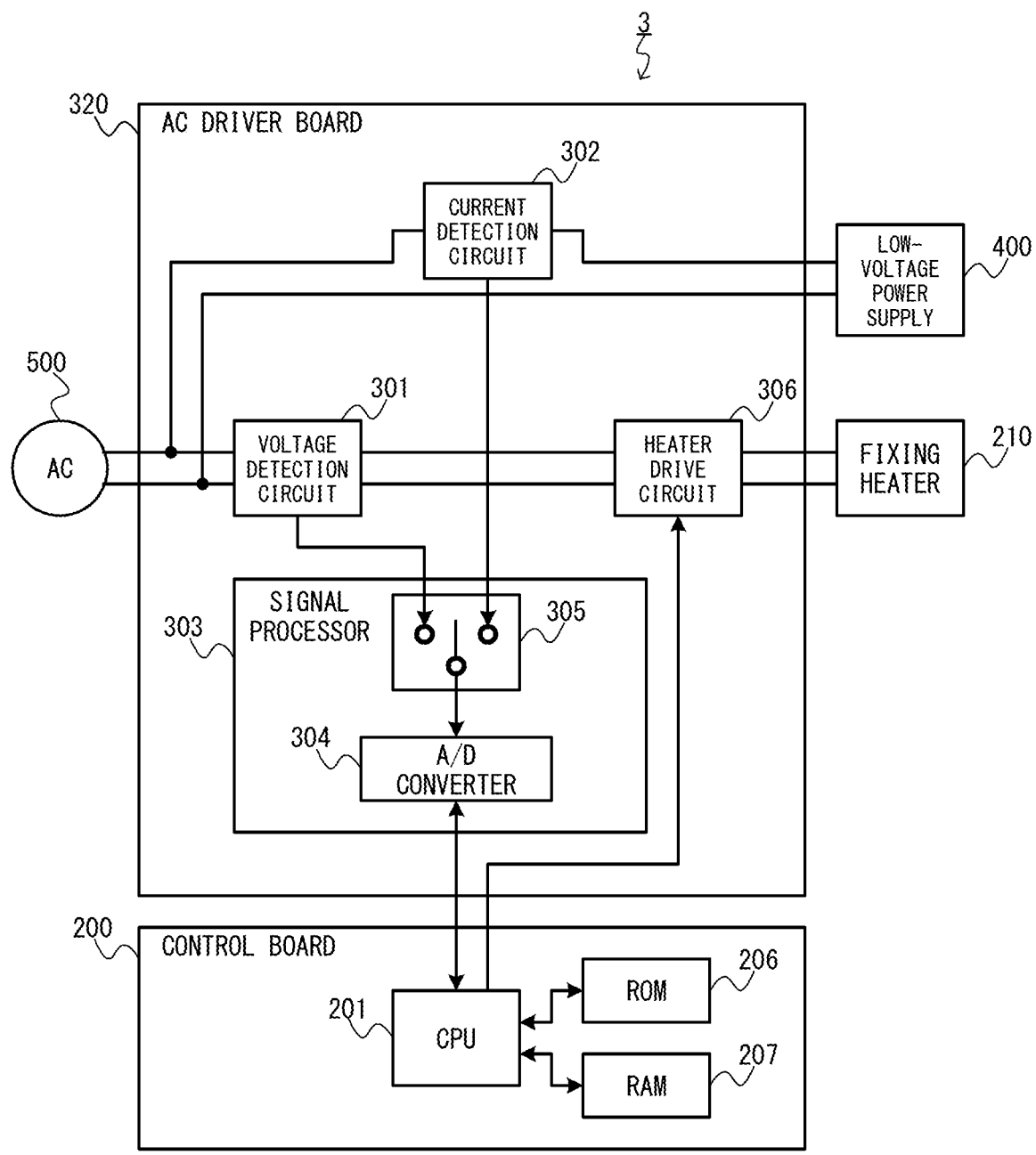
FIG. 7 is a diagram for illustrating another modification example of the AC driver board.

FIG. 7 is a diagram for illustrating another modification example of the AC driver board. An AC driver board 320 provided in a power control apparatus 3 is applicable to a case in which a resistance value of the fixing heater 210 is known. The current detection circuit 302 of the AC driver board 320 is provided between the commercial power supply 500 and the low-voltage power supply 400, to detect only a current value of an AC current supplied to the low-voltage power supply 400. A current value of the AC current supplied to the fixing heater 210 is calculated based on a voltage value detected by the voltage detection circuit 301 and the resistance value of the fixing heater 210. Here, detection timings for the voltage value and the current value are the same as those of FIG. 2.

A voltage signal output from the voltage detection circuit 301 and a current signal output from the current detection circuit 302 are input to the CPU 201 via the switch 305 and the A/D converter 304. The CPU 201 calculates a current value of the AC current supplied to the fixing heater 210 based on a voltage value calculated from the voltage signal and the resistance value of the fixing heater 210. The CPU 201 adds the calculated current value and a current value calculated from a current signal, to thereby calculate a total current value of the current supplied from the AC driver board 320 to the low-voltage power supply 400 and the current supplied therefrom to the fixing heater 210. The current flowing through the fixing heater 210 is calculated based on a voltage value at startup and a voltage phase upon driving the fixing heater 210.

Modification Example 3

Figure 8:
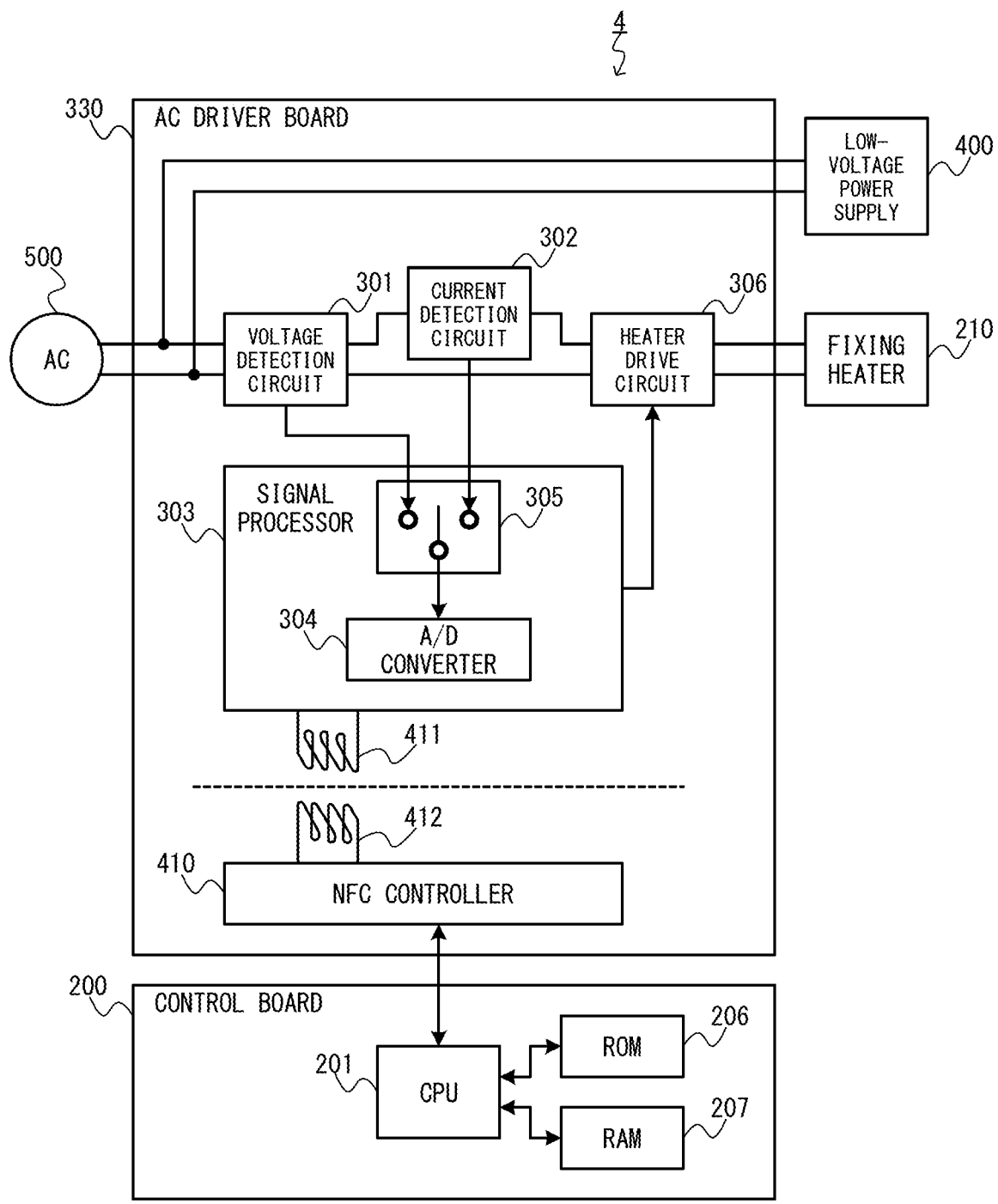
FIG. 8 is a diagram for illustrating another modification example of the AC driver board.

FIG. 8 is a diagram for illustrating another modification example of the AC driver board. An AC driver board 330 provided in a power control apparatus 4 has a configuration including, in addition to the components of the AC driver board 300 of FIG. 2, a near field communication (NFC) antenna 411 on the signal processor 303 side, and an NFC antenna 412 on an NFC controller 410 side. The NFC controller 410 is an IC configured to control communication between the signal processor 303 and the control board 200. That is, the AC driver board 330 adopts NFC communication using the NFC controller 410 for a communication path between the signal processor 303 and the control board 200.

The signal processor 303 is connected to the NFC antenna 411 on the signal processor 303 side, to control operations of the NFC antenna 411. The signal processor 303 and the NFC antenna 411 electrically serve as a primary side terminal. The NFC antenna 412 on the NFC controller 410 side is provided opposite to the primary-side NFC antenna 411. The NFC antenna 411 and the NFC antenna 412 are provided at a distance that ensures electrical isolation and short-range wireless communication therebetween. The NFC antenna 412 is connected to the NFC controller 410. The NFC antenna 412 and the NFC controller 410 serve as a secondary side terminal. The NFC controller 410 is connected to the CPU 201 of the control board 200.

The NFC controller 410 is driven by the low-voltage power supply 400. The NFC-based short-range wireless communication allows power transmission as well. Thus, as soon as the AC power is supplied from the commercial power supply 500, the NFC controller 410 starts power transmission to the signal processor 303 via the short-range wireless communication.

The AC driver board 330 can perform the same control as in the AC driver board 300 while ensuring electrical isolation, through use of the signal processor 303 and the NFC controller 410.

As described above, the power control apparatus 1, 2, 3, and 4 provided in the image forming apparatus 100 of this embodiment are configured to convert into digital signals the voltage signal and current signal converted from the AC power supplied from the commercial power supply 500 through use of the single A/D converter 304. The A/D converter 304 includes the switch 305, and is configured to selectively receive any one of the voltage signal and the current signal. The signal processor 303 including the A/D converter 304 is configured to detect the zero-cross timing of the AC voltage based on the voltage signal and also, determine the detection timing for the voltage value and that for the current value based on the zero-cross timing. With this configuration, the power control apparatus 1, 2, 3, and 4 can reduce the number of A/D converters 304, which enables size reduction of the substrate and cost reduction, and also can perform the same power supply control as in the related art. As described above, according to the present disclosure, power supplied to the load can be controlled with a smaller configuration than the related-art configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-059022, filed Mar. 26, 2019, which is hereby incorporated with reference herein in its entirety.

What is claimed is:
1. A power control apparatus comprising:
a voltage detection circuit configured to generate a voltage signal as an analog signal corresponding to a voltage value of AC power supplied from a commercial power supply to a predetermined load;
a current detection circuit configured to generate a current signal as an analog signal corresponding to a current value of the AC power;
an A/D converter configured to convert each of the voltage signal and the current signal into a digital signal;
a switch configured to selectively output any one of the voltage signal and the current signal to the A/D converter;
a signal processor configured to control a switching operation of the switch based on a detection timing for the voltage value and a detection timing for the current value, which are determined based on the voltage signal; and a controller configured to control supply of the AC power to the load based on the digital signal obtained from the A/D converter.

2. The power control apparatus according to claim 1, wherein the signal processor is configured to cause the switch to input the voltage signal to the A/D converter at startup of a device on which the load is mounted, and to control the switching operation of the switch based on the detection timing during execution of a job.

3. The power control apparatus according to claim 1, wherein the signal processor is configured to detect a zero-cross timing of an AC voltage based on the voltage signal to determine the detection timing for the voltage value and the detection timing for the current value based on the zero-cross timing, and wherein the controller is configured to determine a timing of supplying the AC power to the load with reference to the zero-cross timing.

4. The power control apparatus according to claim 3, wherein the signal processor is configured to determine, with reference to the zero-cross timing, the detection timing for the voltage value to the zero-cross timing, and to determine the detection timing for the current value to be a timing at which an AC current reaches a peak.

5. The power control apparatus according to claim 4, wherein the signal processor is configured to determine the detection timing for the voltage value to a predetermined period around the zero-cross timing, and to determine the detection timing for the current value to be a predetermined period around the timing at which the AC current reaches the peak, with reference to the zero-cross timing.

6. The power control apparatus according to claim 1, wherein the signal processor includes the switch the A/D converter, a first antenna connected to the A/D converter to perform short-range wireless communication, a communication controller configured to perform communication with the controller, and a second antenna connected to the communication controller to perform short-range wireless communication with the first antenna, and wherein the signal processor is configured to perform communication with the controller via the first antenna, the second antenna, and the communication controller.

7. The power control apparatus according to claim 1, wherein the voltage detection circuit is configured to convert the voltage value of the AC power so as to fall below a peak value in accordance with an input range of the A/D converter, to thereby generate the voltage signal.

8. The power control apparatus according to claim 1, wherein the current detection circuit is configured to generate, when a peak current flows through the load, the current signal so as to obtain a voltage value that falls below a peak value in accordance with an input range of the A/D converter.

9. The power control apparatus according to claim 1, further comprising a path for supplying the AC power to the load and a path for supplying the AC power to a predetermined low-voltage power supply, wherein the current detection circuit is provided on the path for supplying the AC power to the predetermined low-voltage power supply.

10. The power control apparatus according to claim 1, further comprising a first path for supplying the AC power to the load and a second path for supplying the AC power to a predetermined low-voltage power supply, wherein the second path diverges from the first path between the AC power and the current detection circuit.

11. An image forming apparatus comprising:

a load to be used for image formation, and is configured to operate with AC power supplied from a commercial power supply;

a voltage detection circuit configured to generate a voltage signal as an analog signal corresponding to a voltage value of the AC power supplied from the commercial power supply to the load;

a current detection circuit configured to generate a current signal as an analog signal corresponding to a current value of the AC power;

an A/D converter configured to convert each of the voltage signal and the current signal into a digital signal;

a switch configured to selectively output any one of the voltage signal and the current signal to the A/D converter;

a signal processor configured to control a switching operation of the switch based on a detection timing for the voltage value and a detection timing for the current value, which are determined based on the voltage signal; and a controller configured to control supply of the AC power to the load based on the digital signal obtained from the A/D converter.

12. The image forming apparatus according to claim 11, wherein the load includes a heater configured to heat a recording material upon fixing an image onto the recording material.

* * * * *